United States Patent
Frigger

[11] 3,716,121
[45] Feb. 13, 1973

[54] ANTISKID SENSOR

[75] Inventor: Heinz Frigger, 607 Langen-Oberlinden, Germany

[73] Assignee: ITT Industries, Inc., New York, N.Y.

[22] Filed: May 27, 1970

[21] Appl. No.: 40,972

[30] Foreign Application Priority Data

May 29, 1969 Germany............P 19 27 235.6
May 29, 1969 Germany............P 19 27 237.8

[52] U.S. Cl............188/181 R, 303/21 CF, 310/156, 324/162, 324/174
[51] Int. Cl...................................B60t 8/08
[58] Field of Search...188/180, 181 A, 181 C, 181 R; 303/21 CE, 21 CF, 21 CG; 324/162, 166, 167, 173, 174; 310/156

[56] References Cited

UNITED STATES PATENTS

| | | | |
|---|---|---|---|
| 3,017,145 | 1/1962 | Yarber | 188/181 A X |
| 3,414,335 | 12/1968 | de Castelet | 188/181 A X |
| 3,469,662 | 9/1969 | Dewar | 188/181 A |
| 3,473,120 | 10/1969 | Ruof | 188/181 A UX |
| 2,541,422 | 2/1951 | Kirkland et al. | 310/156 |
| 3,108,216 | 10/1963 | Fritz et al. | 310/156 X |
| 3,189,886 | 6/1965 | Sonntag | 310/156 UX |
| 3,489,935 | 1/1970 | Hayes | 310/90 X |
| 3,563,351 | 2/1971 | Leiber et al. | 303/21 CF X |

Primary Examiner—Duane A. Reger
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A sensor for vehicle antiskid systems, the sensor having a stationary reading head in direct contact with a rotating data carrier. The carrier may be a flexible edge mounted on the disc of a disc brake system or it may be a rigid carrier mounted on some other member rotating with the wheel such as the inside of the wheel hub. The data carrier has equally spaced variations in some characteristic to which the sensor responds such as magnetic spots, variable electrical resistance, or perforations which can be read by the sensing head.

9 Claims, 5 Drawing Figures

PATENTED FEB 13 1973 3,716,121

Inventor
HEINZE FRIGGER

By *[signature]*
Attorney

Inventor
HEINZE FRIGGER
Attorney

ANTISKID SENSOR

BACKGROUND OF THE INVENTION

1. Field of the Invention

This invention relates to antiskid systems for vehicles and particularly to antiskid system sensors for generating a signal which is a function of wheel speed.

2. Description of Prior Art

Vehicle antiskid systems designed to prevent locking of the wheels when the brakes are applied usually are provided with a sensor of some type for continuously measuring wheel speed. The output of the speed sensor is differentiated to provide a deceleration signal which is used as the parameter for skid control. When the deceleration signal approaches some predetermined value, the brake pressure is reduced by means of a valve to release the brakes for a short time period. When the danger of wheel lockup has been avoided, the brake pressure is increased and the cycle is repeated.

The known sensors used in antiskid systems depend on an air gap between the rotor and stator through which the signal passes. In these sensors when the air gap changes, the magnitude of the induced signal current or voltage also changes. In automotive vehicles the rotor is connected to the wheel and is subject to deformation which causes variations in the air gap. The signal changes, which these variations cause, represent an undesirable distortion or falsification of the deceleration signal.

SUMMARY OF THE INVENTION

An object of the present invention is to provide an antiskid sensor which is unaffected by distortion of the rotor and which is simple and inexpensive to manufacture and assemble.

It is a further object of this invention to provide an antiskid sensor which does not utilize an air gap between the rotor and stator and which may be completely enclosed to protect it from contamination caused by road dirt, moisture, salt, or ice.

This invention achieves these objects by providing a sensor with a direct contact between the rotor and the reading or sensing element. In one embodiment of the invention signal generating means such as points or marks of varying characteristics such as holes, elevations, or varying physical properties such as electrical resistance are carried by a tape, wire, plate, or other part which may be attached to some member rotating with the wheel. A reader contacts the carrier and generates a signal which is a function of the wheel speed. In this embodiment of the invention the reading head may be mounted on the wheel axle while the marks are on the rotating hub.

In another embodiment the rotating element carries a flexible edge bearing signal generating means at equally spaced intervals along the edge. The signal generating means may be points of varying characteristics, particularly electrical, so that as the marks or points move past a stationary reading device a signal is induced which is worked up in the antiskid system to control the brakes. The edge may be a perforated tape, an elastic synthetic material having magnetic properties or marks, or a material with variable electrical resistance. In disc brake systems the edge may be radially or axially orientated on the brake disc while the sensor may be attached to the caliper so that the edge passes through the sensor in a manner similar to the way in which the brake disc passes through the caliper.

The invention may be adapted to drum brakes by making the edge an extension of the cylindrical part of the rotating drum. In order to insure that there is no clearance between the edge and the reading head, the edge, which is elastic, may be biased toward the reading head by means of an elastic pressure medium such as a felt pad.

DESCRIPTION OF THE PREFERRED EMBODIMENTS

Figure 1:
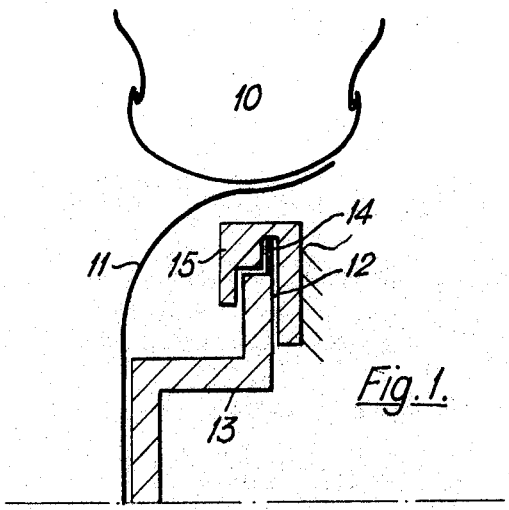
FIG. 1 is a partial sectional view of an automobile wheel, disc brake, and sensor embodying the present invention.
Figure 2:
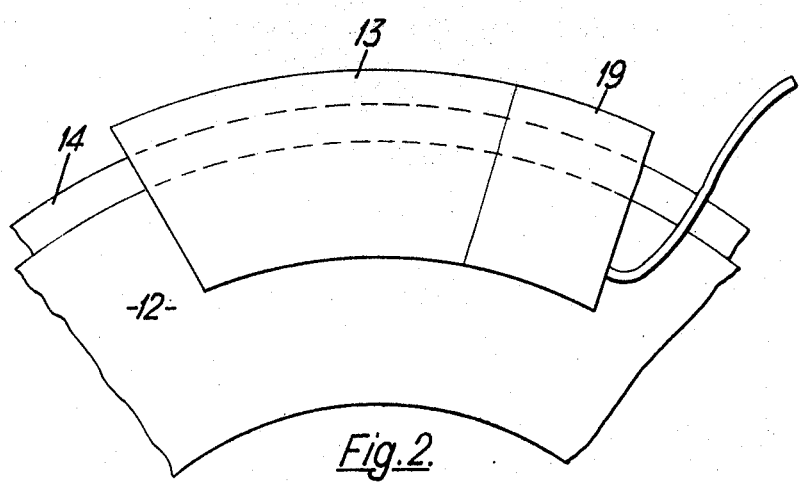
FIG. 2 is a schematic elevational view of the sensor and caliper shown in FIG. 1.
Figure 3:
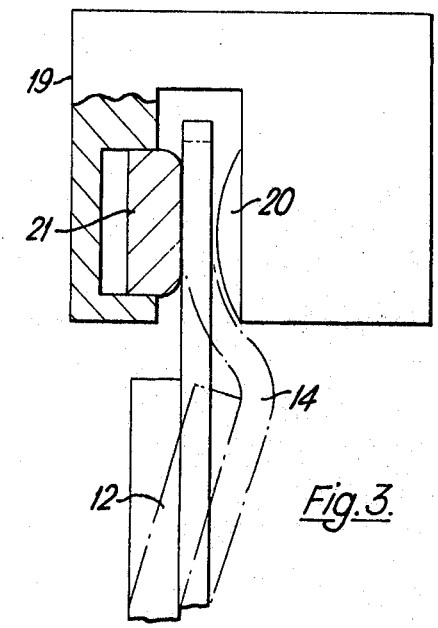
FIG. 3 is an enlarged schematic sectional view showing the sensor and flexible edge of FIG. 1.

FIGS. 1, 2, and 3 show a wheel consisting of a tire 10 and a rim 11 and a caliper 15. A brake disc comprising a flange 12 and a pot-shaped part 13 is arranged in the dished portion of the wheel rim 11. A projecting flexible edge 14 attached to the disc extends radially between the side arms of a reading head 19. The edge is made of a synthetic material similar to a magnetic tape, preferably of polyvinyl chloride. It consists of a carrier and of crystals of ferric oxide in a carrier emulsion. The reading head which is attached to the caliper 15 to form one compact unit, comprises a reading member 20 and a felt pressure pad 21 which applies a slight pressure holding the edge 14 against the reading member 20.

The edge 14 has equally spaced magnetic marks along its surface, the length and spacing of the marks being determined by the requirements of the following antiskid system and the vehicle characteristics.

When the wheel and disc are rotating, the magnetic marks generate a signal proportional to speed in the reading member. When the flange 12 deforms due to cornering or overheating of the brake disc as shown in outline in FIG. 3, the part of edge 14 which is read remains in the same general position while the inside of the edge moves with the disc. In this way the sensoring or reading process remains uneffacted by the deformation of the brake disc.

Figure 4:
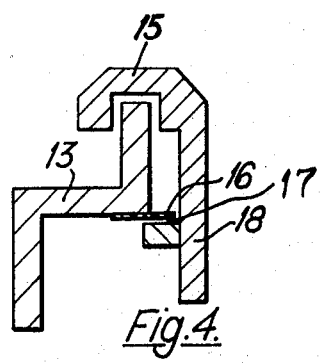
FIG. 4 is a schematic cross sectional view similar to FIG. 1 showing another embodiment of the invention.

In the embodiment of the invention shown in FIG. 4 the edge is arranged in an axial direction on the pot-shaped part 13 of the brake disc. In this embodiment the edge is indicated by numeral 16. The reading head 17 in housing 18 is fixed to the caliper 15. In all other respects this embodiment is similar to that shown in FIGS. 1, 2, and 3.

Figure 5:
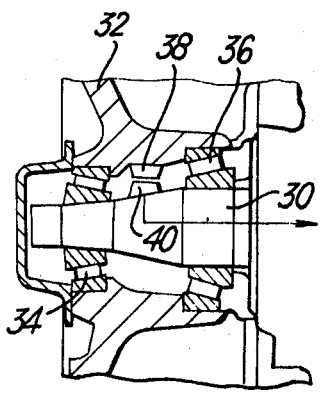
FIG. 5 is a cross sectional view of a vehicle hub and axle also embodying this invention.

In the embodiment of the invention shown in FIG. 5 a stub axle 30 supports a wheel hub 32 in a manner well known in the automotive industry. The wheel hub 32 together with the bearings 34 and 36 form a housing whose cylindrical wall 32 rotates. A data carrier 38 is attached to the inner cylindrical wall of the member 32. A reading head 40 is fixed to the stub axle and is in sliding contact with the carrier 38. The carrier has spaced magnetic marks which induce a signal in the reading head 40 as a function of wheel speed. As in the previous embodiments, the direct contact between the carrier and the reading head eliminates the air gap, the variations of which cause a false signal.

I claim as my invention:

1. An antiskid sensor for determining the speed of a wheel to be braked comprising:
    a brake disc connected for rotation with said wheel about a given axis, and
    a disc brake caliper disposed relative to said disc for braking thereof;
    an annular flexible tape having a first surface portion immediately adjacent one edge thereof and a second surface portion including the remainder of said tape, said first portion being secured to said disc and said second portion extending from said disc towards an adjacent inner portion of said caliper, said second portion having disposed thereon equally spaced variations of a predetermined characteristic along its length; and
    a stationary reading member secured to said caliper in direct contact with said second portion to sense said variations and generate a signal proportional to wheel speed;
    said second portion being free of a rigid supporting member to enable flexing of said second portion to compensate for distortions of said disc and maintain said direct contact between said second portion and said reading member.

2. A sensor according to claim 1, wherein
said second portion has disposed thereon equally spaced magnetic marks which are sensed by said reading member.

3. A sensor according to claim 1, wherein
said second portion includes equally spaced perforations which are sensed by said reading member.

4. A sensor according to claim 1, wherein
said second portion has disposed thereon equally spaced electrical resistance variations which are sensed by said reading member.

5. A sensor according to claim 1, wherein
said first portion is secured to the periphery of said disc, said second portion extending radially from said periphery of said disc and transverse to said given axis;
said adjacent inner portion of said caliper is a surface of said caliper parallel to said given axis; and
said reading member is secured to one inner surface of said caliper transverse of said given axis in direct contact with one surface of said second portion.

6. A sensor according to claim 5, further including
an elastic pressure medium disposed in the other surface of said caliper transverse to said given axis in direct contact with the other surface of said second portion to maintain said second portion in said direct contact with said reading member even during distortions of said disc.

7. A sensor according to claim 6, wherein said elastic pressure medium is a felt pad.

8. A sensor according to claim 1, wherein
said first portion is secured to a surface of said disc parallel to said given axis, said second portion extending transverse to said disc and parallel to said given axis;
said adjacent inner portion of said caliper is one surface of said caliper transverse to said given axis, said one surface of said caliper having secured thereto a component disposed in transverse relation to said one surface of said caliper adjacent said second portion; and
said reading member is secured to said component in direct contact with one surface of said second portion.

9. A sensor according to claim 1, wherein
said tape is made of a flexible metal foil.

* * * * *